(12) United States Patent
Rosswurm et al.

(10) Patent No.: US 9,371,789 B2
(45) Date of Patent: Jun. 21, 2016

(54) SYSTEM AND METHOD FOR A SELF-ADJUSTING DUAL FUEL GAS CONTROL

(71) Applicant: Cummins Inc., Columbus, IN (US)

(72) Inventors: Mark A. Rosswurm, Columbus, IN (US); Axel O. zur Loye, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 186 days.

(21) Appl. No.: 14/310,521

(22) Filed: Jun. 20, 2014

(65) Prior Publication Data

US 2014/0373822 A1 Dec. 25, 2014

Related U.S. Application Data

(60) Provisional application No. 61/837,576, filed on Jun. 20, 2013.

(51) Int. Cl.
*F02D 41/00* (2006.01)
*F02D 41/14* (2006.01)
*F02D 19/08* (2006.01)

(52) U.S. Cl.
CPC ........ *F02D 41/0027* (2013.01); *F02D 41/0025* (2013.01); *F02D 41/1446* (2013.01); *F02D 19/08* (2013.01); *F02D 2200/0611* (2013.01); *F02D 2200/0802* (2013.01); *Y02T 10/36* (2013.01)

(58) Field of Classification Search
CPC ... F02D 19/023; F02D 19/06; F02D 19/0647; F02D 19/08; F02D 19/081; F02D 41/00; F02D 41/0027; Y02T 10/32; Y02T 10/34; Y02T 10/36
USPC ............ 123/1 A, 27 GE, 295, 299, 304, 518, 123/525, 526, 575–578, 676; 701/103, 104, 701/114; 73/114.22, 114.25, 114.52, 73/114.53
See application file for complete search history.

(56) References Cited

U.S. PATENT DOCUMENTS

| | | |
|---|---|---|
| 5,937,800 A | 8/1999 | Brown et al. |
| 7,093,588 B2 | 8/2006 | Edwards |
| 7,222,015 B2 | 5/2007 | Davis et al. |
| 7,270,089 B2 | 9/2007 | Wong |
| 7,509,209 B2 | 3/2009 | Davis et al. |
| 8,028,676 B2 | 10/2011 | Ancimer et al. |

(Continued)

FOREIGN PATENT DOCUMENTS

WO  WO2011153069 A1  12/2011

*Primary Examiner* — John Kwon
*Assistant Examiner* — Johnny H Hoang
(74) *Attorney, Agent, or Firm* — Faegre Baker Daniels LLP

(57) ABSTRACT

This disclosure provides a system and method that eliminates the need for manually calibrating or adjusting a dual fuel internal combustion engine to compensate for variations in composition of a gaseous fuel or other variations, such as ambient or site conditions. The system and method functions by determining an engine load, determining an advantageous gaseous fuel substitution rate from the engine load and speed in addition to an actual gaseous fuel substitution rate, modifying the advantageous gaseous fuel substitution rate by a minimum liquid fuel flow rate, engine protection parameters, and oxidation catalyst protection parameters, and then determining an error term in response to the modified advantageous gaseous fuel substitution rate and the actual gaseous fuel substitution rate. The error term is used to adjust a gaseous fuel control valve.

19 Claims, 2 Drawing Sheets

(56) References Cited

U.S. PATENT DOCUMENTS

| | | | |
|---|---|---|---|
| 8,463,528 B2* | 6/2013 | Cologna | F02D 41/0025 123/304 |
| 2002/0007805 A1* | 1/2002 | Green | F02B 3/06 123/27 GE |
| 2012/0004824 A1* | 1/2012 | Milton | F02B 7/06 701/103 |
| 2014/0069386 A1* | 3/2014 | Coldren | F02D 19/061 123/456 |
| 2015/0167590 A1* | 6/2015 | Otto zur Loye | F02M 21/0287 60/601 |

* cited by examiner

SYSTEM AND METHOD FOR A SELF-ADJUSTING DUAL FUEL GAS CONTROL

CROSS-REFERENCE TO RELATED APPLICATION

This application claims priority to Provisional Application No. 61/837,576, filed Jun. 20, 2013, which is hereby expressly incorporated by reference herein in its entirety.

FIELD OF THE INVENTION

This disclosure relates to an internal combustion engine that uses a combination of a liquid fuel and a gaseous fuel, which may be described as a dual fuel engine.

BACKGROUND

Dual fuel engines may use a liquid fuel or a combination of a liquid and a gaseous fuel. However, the quality of locally available gaseous fuel can vary from location to location. Such variances may be significant, for example, in unimproved locations, such as drilling sites located in remote locations where high quality gaseous fuel may be unavailable and to which liquid fuel may be expensive to transport. In many of these areas, unrefined or unpurified combustible gaseous fuel from an oil or natural gas well may be readily available. In conventional dual fuel internal combustion engines, a general procedure involves measuring the quality of the locally available gaseous fuel and manually adjusting or calibrating the internal combustion engine to provide a proper ratio of gaseous fuel to liquid fuel or an amount of gaseous fuel to be substituted for liquid fuel based on (i.e., in response to) the quality of the locally available gaseous fuel. Fuel quality may include, for example, a heating value or energy content of the gaseous fuel per unit volume, the methane number (which is an indication of the anti-knock properties of the gaseous fuel), and/or the like.

SUMMARY

Embodiments of the present invention provide a substitution rate feedback loop that may facilitate automatically adjusting the operation of a dual fuel internal combustion engine dynamically by sensing specific operating parameters of the engine and using those parameters to adjust the ratio of gaseous fuel to liquid fuel to improve (e.g., optimize) usage of gaseous fuel and/or substitution of gaseous fuel for liquid fuel. In particular, embodiments of the invention include a method for dynamic adjustment of operation of a dual fuel internal combustion engine. The method includes determining, using a control module, at least one operating parameter of the engine, where the at least one operating parameter of the engine includes an engine load; and adjusting, in response to the at least one operating parameter, a ratio of gaseous fuel to liquid fuel consumed by the engine.

Embodiments of the invention include a method that includes determining an engine load; determining an advantageous gaseous fuel substitution rate in response to the engine load and an engine speed; determining a minimum liquid fuel flow rate; and determining an actual gaseous fuel substitution rate in response to the engine load and the minimum liquid fuel flow rate. Embodiments of the method also include determining an exhaust gas temperature and an oxidation catalyst input temperature. The advantageous gaseous fuel substitution rate may be modified in response to the minimum liquid fuel flow rate, the exhaust gas temperature, and the oxidation catalyst input temperature. In embodiments, the method also includes determining a magnitude of a gaseous fuel error in response to the modified advantageous gaseous fuel substitution rate and the actual gaseous fuel substitution rate; and adjusting a gas control valve in response to the magnitude of the error.

Embodiments of the invention also include a system for dynamic adjustment of operation of a dual fuel internal combustion engine. Embodiments of the system include a gas control valve configured to control a flow of gaseous fuel and a control module connected to the gas control valve and configured to provide control signals to the gas control valve. The control module may include a processor configured to execute machine-readable instructions that, when executed, cause the processor to provide a plurality of modules, the plurality of modules including an engine load module configured to determine an engine load associated with the engine. The modules may also include an optimal gaseous fuel substitution rate module configured to receive the determined engine load from the engine load module and determine an advantageous gaseous fuel substitution rate in response to the engine load. In embodiments, the advantageous gaseous fuel substitution rate may be an optimal gaseous fuel substitution rate. The modules may also include an actual gaseous fuel substitution rate module configured to (1) receive the determined engine load from the engine load module, (2) receive a diesel fuel rate; and (3) determine an actual gaseous fuel substitution rate in response to the engine load and diesel fuel rate. In embodiments, the modules further include an input summing module configured to determine a gaseous fuel substitution rate reference in response to the determined advantageous gaseous fuel substitution rate and one or more operational parameters of the engine; and a gas substitution determination module configured to provide a position control signal, in response to the gaseous fuel substitution rate reference, to the gas control valve.

Figure 1:
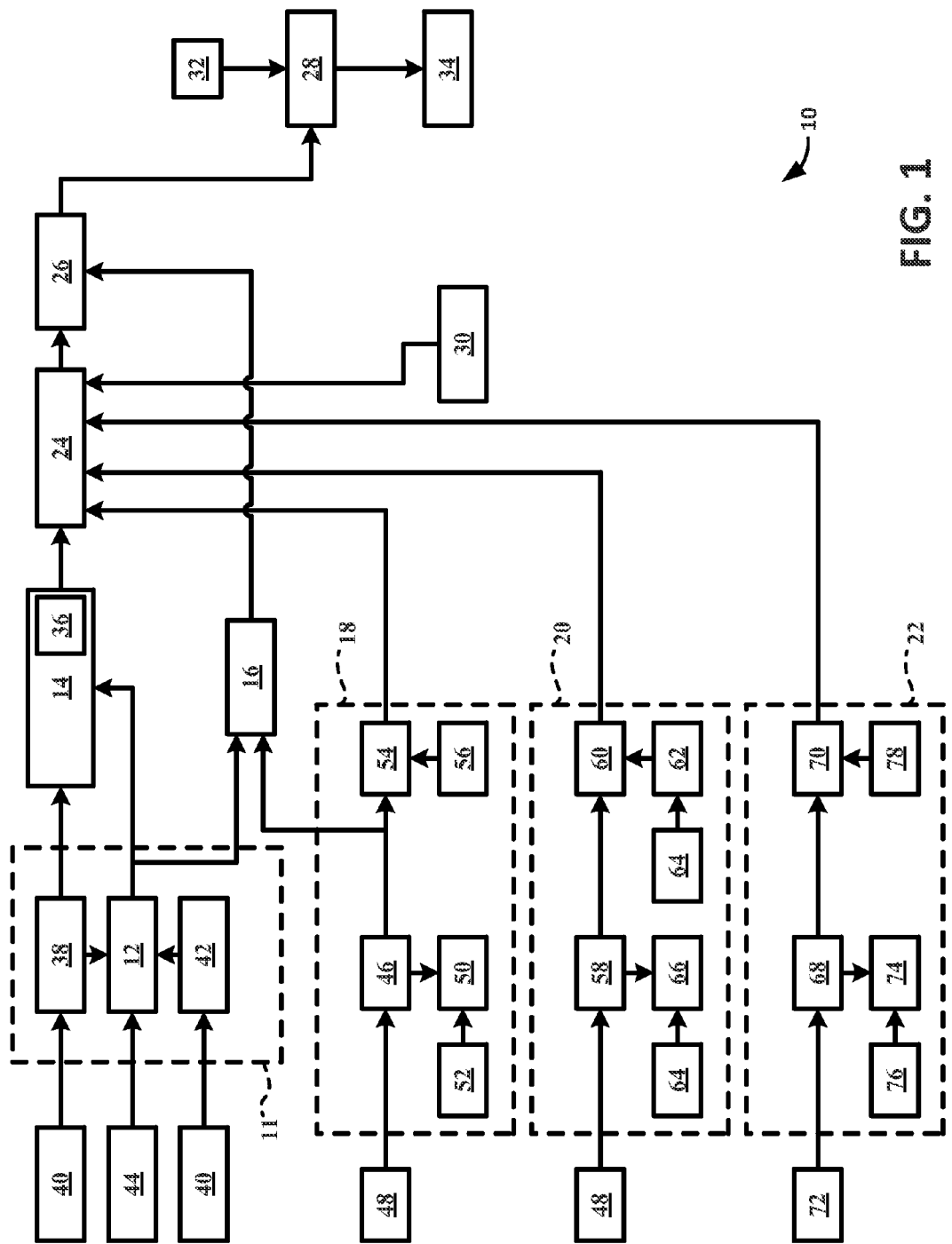
FIG. 1 is a control logic diagram depicting an illustrative process flow for dynamically adjusting operation of a dual fuel internal combustion engine in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Turning now to FIG. 1, embodiments of a system and method of adjusting the ratio of liquid fuel to gaseous fuel in the form of a control logic diagram or process are shown and generally indicated at 10. Control logic diagram 10 includes an engine load module 11, an optimal gaseous fuel substitution rate module 14, an actual gaseous fuel substitution rate module 16, a minimum liquid fuel rate module 18, an exhaust gas temperature module 20, an engine knock determination module 22, an input summing module 24, a gas substitution determination module 26, and a gas control valve 28 configured to be adjusted by an output of the gas substitution determination module 26. Control logic diagram 10 may also include an oxidation catalyst protection module 30. Gas control valve 28 may be positioned on an engine body (not shown) of the internal combustion engine and may be configured to control the amount of gaseous fuel flowing from a gaseous fuel supply 32 to a compressor inlet 34 of the dual fuel internal combustion engine. Gaseous fuel supply 32 may be positioned as an element, system, source, or component separate from the internal combustion engine and fluidly connected to the internal combustion engine. Compressor inlet 34 is included as a part of an intake system (not shown) of the internal combustion engine.

Various aspects of embodiments of the invention may be described in terms of sequences of actions to be performed by elements of a computer system or other hardware capable of executing programmed instructions such as, for example, a general purpose computer, special purpose computer, workstation, or other programmable data processing apparatus. It will be recognized that in each of the embodiments, various actions may be performed by specialized circuits (e.g., discrete logic gates interconnected to perform a specialized function), by program instructions (software), such as logical blocks, program modules etc. being executed by one or more processors (e.g., one or more microprocessor, a central processing unit (CPU), and/or application specific integrated circuit (ASIC)), and/or the like. For example, embodiments may be implemented in hardware, software, firmware, middleware, microcode, or any combination thereof. The instructions may be program code or code segments that perform tasks and may be stored in a non-transitory machine-readable medium such as a storage medium or other storage(s). A code segment may represent a procedure, a function, a subprogram, a program, a routine, a subroutine, a module, a software package, a class, or any combination of instructions, data structures, program statements, and/or the like. A code segment may be coupled to another code segment or a hardware circuit by passing and/or receiving information, data, arguments, parameters, memory contents, and/or the like.

The non-transitory machine-readable medium may additionally be considered to be embodied within any tangible form of computer readable carrier, such as solid-state memory, magnetic disk, and optical disk containing an appropriate set of computer instructions, such as program modules, and data structures configured to cause a processor to carry out aspects of embodiments of the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), and/or any other tangible medium capable of storing information.

It should be noted that the system of the present disclosure is illustrated and discussed herein as having various modules. These modules may be process steps, program modules that include process steps, units that perform particular functions, and/or the like. It should be understood that these modules and units are merely schematically illustrated based on their function for clarity purposes, and do not necessarily represent specific hardware or software. In this regard, these modules, units and/or other components may be hardware and/or software implemented to perform aspects of various functions explained herein. Various functions of components may be combined and/or segregated as hardware and/or software modules in any manner, and/or may be useful separately and/or in combination. Input/output (I/O) devices and/or user interfaces including, but not limited to, keyboards, displays, pointing devices, and/or the like, can be coupled to the system directly and/or through intervening I/O controllers. Thus, various aspects of embodiments of the invention may be embodied in many different forms, and all such forms are contemplated to be within the scope of the invention.

According to embodiments, electrical and/or software aspects of embodiments of control logic diagram 10 may be implemented in one or more control modules (not shown), which may be an electronic control unit or electronic control module (ECM) that may be configured to monitor conditions of a dual fuel internal combustion engine, an associated vehicle in which an engine may be located, and/or the like. The control module may be a single processor, a distributed processor, an electronic equivalent of a processor, and/or any combination of the aforementioned elements, as well as software, electronic storage, fixed lookup tables and/or the like. The control module may include a digital and/or analog circuit and may connect to components of the internal combustion engine by a wire harness, though such connection may be by other means, including a wireless system. For example, the control module may connect to, and provide control signals to, gas control valve 28.

In embodiments, a duel fuel engine's advantageous (e.g., optimal) gas substitution rate map may be determined by means of test cell performance testing and may be loaded as a calibration in a lookup table 36 included in, and/or referenced by, optimal gaseous fuel substitution rate module 14. The values in lookup table 36 may represent, for example, advantageous and/or optimal (e.g., best-case or best condition) scenarios with an optimal or highest possible quality gaseous fuel, a variety of fuel qualities, and/or the like.

According to embodiments, to determine both an advantageous gas substitution rate and an actual gas substitution rate, engine load is determined, e.g., using engine load module 11. As shown in FIG. 1, engine load module 11 may include an engine load process 12, an engine speed process 38, and an engine intake manifold boost pressure and temperature process 42. The intake manifold boost pressure and temperature may be measured, for example, by sensors positioned in an intake of the internal combustion engine. Engine load module 11 may receive signals from an engine bus, e.g., a J1939 bus, and/or from a stimulation pump and/or other load 44. In embodiments, for example, the stimulation pump may include a pump configured for use in any number of high pressure applications such as, for example, hydraulic fracturing, though not all such applications involve hydraulic fracturing. Engine load may be determined from a "virtual sensor," which may include sensing one or more operational parameters of the engine, for example engine speed (e.g., RPM), boost or intake manifold pressure, intake manifold temperature, compressor exit temperature, indicated mean effective pressure (IMEP) as measured with a cylinder pressure sensor, turbine inlet temperature, turbine exit temperature, injection timing, and/or other sensor inputs that may be used to calculate or estimate engine load. In embodiments, engine load may be estimated by measuring or calculating engine speed 38, which may be received from an engine bus, e.g., J1939 bus 40, and by measuring engine intake manifold boost pressure and temperature 42, which may be received from an engine bus, e.g., J1939 bus 40. Engine load process 12 may be configured to take engine speed 38, which may be in terms of RPM and which may be measured by a sensor positioned on an engine crank shaft or other moving component or system of the internal combustion engine, and intake manifold boost pressure and temperature 42, and determine (e.g., calculate) an engine load.

In embodiments, actual engine load (which may be, or include, engine power) may be determined in many different ways and may, for example, be used as a comparison to the calculated engine load or power. In embodiments, an external load sensor or signal may provide an input to engine load process 12. In embodiments, actual engine power may be determined by using engine output RPM and a torque signal indicative of engine output torque. In embodiments, if the engine drives a generator, a kW load signal from the generator may provide load information. In embodiments, external load sensor 44 is a hydraulic horsepower signal from a "frac" trailer. A "frac" trailer refers to a unit on which a stimulation pump (e.g., a hydraulic fracturing ("frac") pump) is mounted and powered by the dual fuel engine. As indicated above, the external load sensor 44 may be associated with any type of stimulation pump. As shown in FIG. 1, the engine load from engine load module 11 is output to optimal gaseous fuel substitution rate module 14 and actual gaseous fuel substitution rate module 16. Engine load module 11 also may provide engine speed (e.g., RPM) to optimal gaseous fuel substitution rate module 14.

In embodiments, optimal gaseous fuel substitution rate module 14 determines an advantageous (e.g., more efficient, or at least somewhat advantageous with respect to yielded engine power, efficiencies, fuel consumption, and/or the like) gaseous fuel substitution rate based on (i.e., in response to) engine load, engine speed (e.g., RPM), and a quality of gaseous fuel (e.g., a methane number). In embodiments, the advantageous gaseous fuel substitution rate may be an optimal gaseous fuel substitution rate (e.g., a best-possible rate in achievable in the circumstances). In embodiments, optimal gaseous fuel substitution rate module 14 determines an advantageous gaseous fuel substitution rate by referencing advantageous gaseous fuel substitution rate map lookup table 36. In embodiments, any number of lookup tables 36 may be provided and may include optimal gaseous fuel substitution rate map lookup tables. Lookup table 36 may, for example, be configured to provide rates based on various operating conditions, fuel qualities, and/or the like. Because the gaseous fuel quality (e.g., its energy content) may vary, the actual substitution rate may vary. In embodiments, the lookup table 36 may represent advantageous gaseous substitution rate as a function of at least one of an engine load, an engine speed, an intake manifold temperature, and a methane number. Each of a number of different lookup tables 36 may be associated, for example, with a different methane number. In embodiments, the output of optimal gaseous fuel substitution rate module 14 is sent to input summing module 24, where the output signal is summed or modified by signals from minimum liquid fuel rate module 18, exhaust temperature module 20, engine knock determination module 22, oxidation catalyst protection module 30, and/or the like.

In addition to receiving engine load from engine load module 11, actual gaseous fuel substitution rate module 16 may receive a diesel fuel rate from minimum liquid fuel flow rate module 18. Actual gaseous fuel substitution rate module 16 may use the liquid and/or diesel fuel flow rate data from minimum liquid fuel flow rate module 18 as a measure of diesel energy. In embodiments, the difference between the engine load and the diesel fuel power represents an estimate of the power provided by the gaseous fuel, which thus represents an estimate of the actual gaseous fuel substitution rate. For example, engine load module 11 may estimate the total fuel energy flow, $E_{Total}$, and correlate the total fuel energy flow to the total engine power. In embodiments, this estimate may be refined by measuring engine power and speed, and correlating power and speed to data acquired during testing and stored or saved in lookup tables. According to embodiments, because many diesel fuel systems include sensors or other measures of actual diesel fuel flow, it may be possible to estimate the diesel energy flow based on (i.e., in response to) the commanded diesel injection event. Assuming a nominal heating value for the diesel fuel, for example, the diesel fuel energy flow, $E_{Diesel}$, may be estimated. By using the total fuel energy flow, $E_{Total}$, and the diesel fuel energy flow, $E_{Diesel}$, the gaseous fuel energy flow, $E_{Gas}$, and the gaseous fuel substitution rate, $R_{Substitution}$, may be calculated using Equation (1).

$$R_{Substitution} = \frac{E_{Total} - E_{Diesel}}{E_{Total}} = \frac{E_{Gas}}{E_{Total}} \qquad \text{Equation (1)}$$

The actual gaseous fuel substitution rate is provided from actual gaseous fuel substitution rate module 16 to gas substitution determination module 26, described further hereinbelow.

As shown in FIG. 1, minimum liquid fuel flow rate module 18 may include a diesel fuel rate process 46, a gas shutdown process 50, a shutdown limit lookup table 52, a minimum liquid fuel flow process 54, and a gain and ramp rate process 56. Minimum liquid fuel flow rate module 18 may be configured to receive fuel flow data from a dual fuel engine bus, which may be, e.g., by way of a J1939 data link 48. In embodiments, J1939 data link 48 provides the liquid or diesel fuel flow rate to diesel fuel rate process 46. Diesel fuel rate process 46 may provide the diesel fuel flow rate to actual gaseous fuel substitution rate module 16, minimum liquid fuel flow process 54, and/or gas shutdown process 50. Shutdown limit lookup table 52 may be configured to provide a signal to gas shutdown process 50 representative of a gas shutdown limit based on (i.e., in response to) engine load.

In embodiments, gas shutdown process 50 determines whether an engine operating condition requires diesel-only operation. For example, during low-load operating conditions gaseous fuel substitution may be undesirable and gas shutdown process 50 may be configured to stop gaseous fuel substitution. In embodiments, the gas shutdown process 50 may facilitate protecting the engine from undesirable operating conditions, such as during heavy knock conditions, when substitution of gaseous fuel may be undesirable. The engine may also provide other information to gas shutdown process 50 in anticipation of a condition where stopping gaseous fuel substitution may be desirable. For example, if an operator is commanding a low load condition or other condition where gaseous fuel substitution is undesirable, then gas shutdown process 50 may cause gaseous fuel substitution to stop.

In embodiments, minimum liquid fuel flow process 54 determines a minimum flow rate of liquid fuel required to ignite a lean gas/air fuel mixture in a combustion chamber of the internal combustion engine. The minimum flow rate of liquid fuel from minimum liquid fuel flow process 54 may be provided as an input to input summing module 24. In embodiments, to determine the required minimum liquid fuel flow rate, process 54 receives a liquid fuel gain and a liquid fuel ramp rate from a gain and ramp rate process 56. According to embodiments, if the liquid fuel flow is below a minimum flow rate, ignition of the mixture of gaseous and liquid fuel may be unreliable. Additionally, a minimum liquid fuel flow may be required to cool a nozzle of a fuel injector of the engine. Moreover, when the liquid fuel flow rate is very low, a fuel injector may be unable to reliably deliver liquid fuel, and a liquid fuel injection process may become unreliable or unstable with injected fuel quantities ranging from zero to more than necessary for operation.

According to embodiments, exhaust gas temperature module 20 includes an exhaust gas temperature process 58, an exhaust gas PI loop 60, an EGT gain process 62, a lookup table 64 of engine speed and load, and an exhaust gas temperature shutdown process 66. Exhaust gas temperature process 58 receives exhaust gas data from an engine bus, which may be by way of J1939 data link 48. The exhaust gas temperature sensor may be positioned along an exhaust or aftertreatment system (not shown). In embodiments, exhaust gas temperature process 58 provides exhaust gas temperature data to exhaust gas PI loop 60 and to exhaust gas temperature process 66. Exhaust gas temperature process 66 also may receive data signals from a lookup table 64 of engine speed and load representing an exhaust gas temperature limit, and may use the exhaust gas temperature in comparison to an exhaust gas temperature limit to shut down the engine in the event of an uncorrectable over-temperature condition of the exhaust gas. Exhaust gas PI loop 60 also may receive exhaust gas temperature gain from EGT gain process 62, which receives data from lookup table 64 of engine speed and load shutdown. In embodiments, the data from lookup table 64 of engine speed and load shutdown sets the exhaust gas temperature limit. Exhaust gas PI loop 60 also may determine whether the gaseous fuel substitution rate needs to be decreased to decrease exhaust temperature or to prevent excessive exhaust temperature. Thus, exhaust gas temperature module 20 may be, include, or be included within, a protection process for the engine. The output of exhaust gas temperature module 20 may be provided to input summing module 24.

As shown in FIG. 1, engine knock determination module 22 includes a detonation sensing process 68, a knock limit PI loop 70, a knock limit process 74, a knock limit lookup table 76, and a knock gain and ramp process 78. According to embodiments, detonation sensing process 68 receives a knock data signal from knock sensors 72 positioned on the engine body and provides the knock data to knock limit PI loop 70. Detonation process 68 also may provide knock data to a knock limit process 74 that can shut down flow of gaseous fuel and cause the engine to run in a diesel-only mode in the case of excessive engine knock. Knock limit process 74 also may receive data from a knock limit lookup table 76 to aid in the determination of knock limits for an engine condition. Knock limit PI loop 70 may use the detonation information from detonation sensing process 68 and knock gain and knock ramp rate information from knock gain and ramp rate process 78 to determine whether the gaseous fuel substitution needs to be reduced to decrease potentially damaging engine knock. According to embodiments, knock limit PI loop 70 is a closed loop process. While knock limit PI loop 70 may reduce the gaseous fuel substitution rate to reduce or eliminate knock, once the knock condition has been alleviated or controlled, the gaseous fuel substitution rate may be slowly or gradually increased until a moderate knock condition is reached, whereupon the gaseous fuel substitution rate may be decreased. Embodiments, of the closed loop process may permit control logic process 10 to compensate for variations in methane number, a contributor to knock, and/or for variations in ambient conditions, for example, if the ambient temperature is elevated, the intake manifold temperature increases and the engine may knock more quickly than when at a lower ambient temperature. In embodiments, an engine operator may enter a methane number into the control system for the engine and, by using a predetermined, target gaseous fuel substitution rate determined by testing, the engine may be operated without repeatedly going into knock.

As with exhaust gas temperature module 20, engine knock determination module 22 may be a safety process for the dual fuel internal combustion engine. The engine knock limit data determined (e.g., calculated) by knock limit PI loop 70 may be provided to input summing module 24.

According to embodiments, oxidation catalyst protection module 30 receives signals from an oxidation catalyst input temperature sensor positioned at an inlet to an oxidation catalyst, which may be positioned in an aftertreatment system of the engine, and an oxidation catalyst output temperature sensor positioned at an exit of the oxidation catalyst or located on the oxidation catalyst. If oxidation catalyst protection module 30 determines that the oxidation catalyst is overheating, then oxidation catalyst protection module 30 may be configured to provide a signal to input summing module 24 indicating a need to reduce the gaseous fuel substitution rate or stopping the flow of gaseous fuel completely. In addition to modifying gaseous fuel flow in the event of an increase in temperature through the oxidation catalyst, oxidation catalyst protection module 30 may monitor the absolute temperature of the oxidation catalyst and rate of temperature increase of the oxidation catalyst and reduce the rate of gaseous fuel substitution or stop it completely, if any of these temperature parameters exceeds predetermined conditions, in order to protect the oxidation catalyst.

According to embodiments, input summing module 24 receives the signals described hereinabove from optimal gaseous fuel substitution rate module 14, minimum liquid fuel rate module 18, exhaust gas temperature module 20, engine knock determination module 22, and oxidation catalyst protection module 30. If any of the parameters received from minimum liquid fuel rate module 18, exhaust gas temperature module 20, engine knock determination module 22, and/or oxidation catalyst protection module 30 reach a programmable set point, then input summing module 24 may be configured to determine a gaseous fuel substitution rate reference by subtracting the P&I values received from minimum liquid fuel rate module 18, exhaust gas temperature module 20, engine knock determination module 22, and/or oxidation catalyst protection module 30 from the advantageous or optimal gaseous fuel substitution rate provided by module 14. The substitution rate reference determined or calculated by input summing module 24 may be provided to gas substitution determination module 26, which also may receive the actual gaseous fuel substitution rate from actual gaseous fuel substitution rate module 16. In embodiments, the values from minimum liquid fuel rate module 18, exhaust gas temperature module 20, engine knock determination module 22, and oxidation catalyst protection module 30 may be limited in range to prevent increasing the advantageous gaseous fuel substitution rate by a protection term or value. In embodiments, if no correction values are received from the minimum liquid fuel rate process and the protection processes, then the calculated difference in the input summing module 24 is the advantageous gaseous fuel substitution rate.

According to embodiments, the advantageous gaseous fuel substitution rate from module 24 is sent as a signal to gas substitution determination module 26, which also receives the actual gaseous fuel substitution rate from module 16. In embodiments, gas substitution determination module 26 subtracts the actual gaseous fuel substitution rate from the advantageous gaseous fuel substitution rate, which yields an error term. The error term may include, for example, a magnitude of error, a sign (indicating positive or negative error), a metric derived from an error magnitude, and/or the like. In embodiments, the error term may be multiplied by a proportional term, an integral term, and/or a derivative term (PID) in gas substitution determination module 26. The result of this calculation may be scaled based on (i.e., in response to) the configuration of gas control valve 28 and provided to gas control valve 28 as a position control signal that correlates to a cross-sectional flow area or a gas flow rate through gas control valve 28. In embodiments, the sign corresponds to an angular position of gas control valve 28. For example, if the error term is positive (e.g., the actual gaseous fuel substitution rate is less than the advantageous gaseous fuel substitution rate), gas substitution determination module 26 may be configured to command gas control valve 28 to open until the advantageous gaseous fuel substitution rate is reached and/or until a protection parameter limit stored in gas substitution determination module 26 is reached. Thus the engine may be configured to operate at a maximum gaseous fuel substitution rate for the gaseous fuel composition, which includes fuel energy content and methane number, site conditions, e.g., temperature, ambient pressure, altitude, and/or humidity, and part-to-part variation or component, e.g., wear or variation in gas flow control valve 28, without requiring manual intervention, e.g., calibration or measurement of the energy content of the gaseous fuel.

Figure 2:
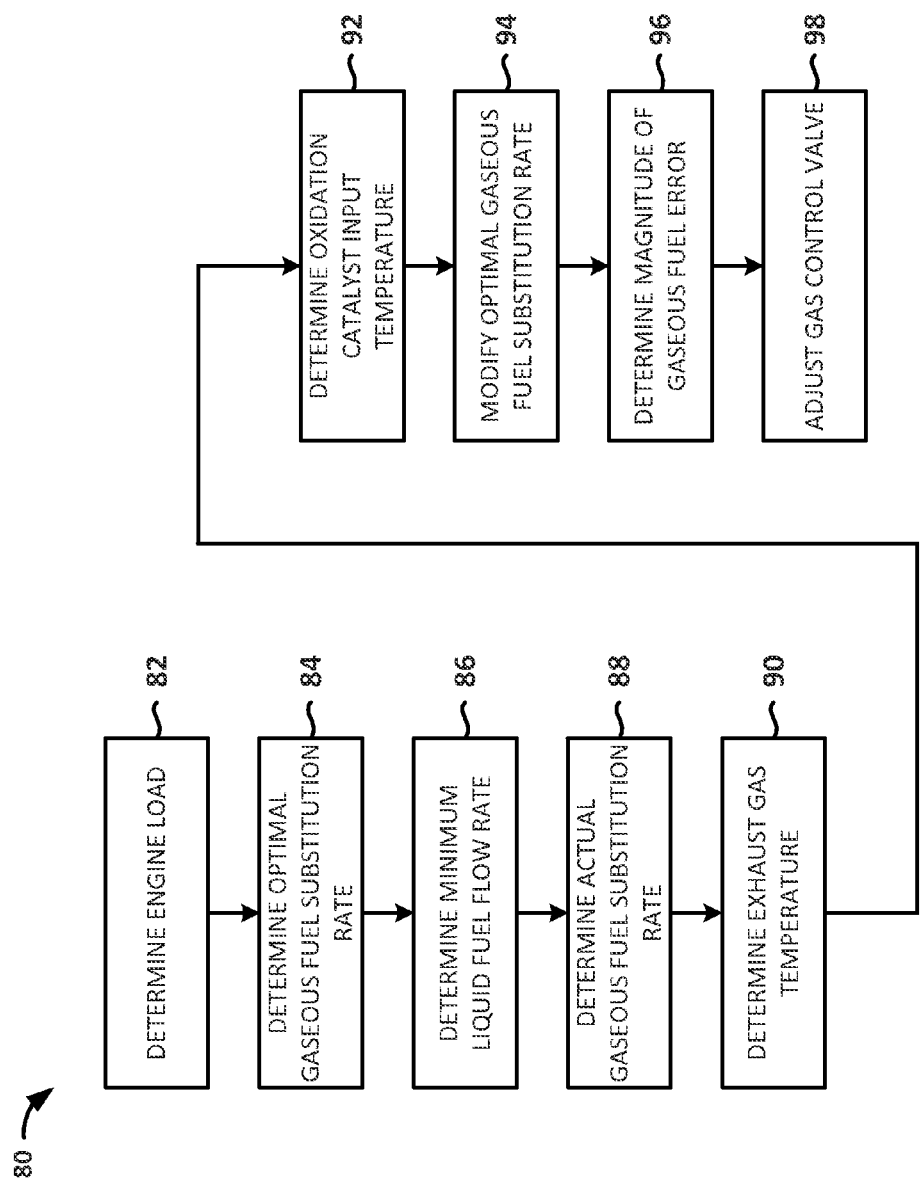
FIG. 2 is a flow diagram depicting an illustrative method of dynamically adjusting the operation of a dual fuel internal combustion engine in accordance with embodiments of the present invention.

As shown in FIG. 2, embodiments of the invention include a method 80 that may, for example, minimize a need for measuring energy content of gaseous fuel and manually calibrating or adjusting the internal combustion engine. According to embodiments, the method 80 may include determining an engine load (block 82). The engine load may be determined, in embodiments, by sensing one or more operational parameters of the engine and calculating the engine load in response to the sensed one or more operational parameters. The sensed one or more operational parameters may include, for example, an engine speed, an intake manifold boost pressure, an intake manifold temperature, a compressor exit temperature, an indicated mean effective pressure (IMEP), a turbine inlet temperature, a turbine exit temperature, an injection timing, and/or the like. In embodiments, determining the engine load may include receiving an engine load signal from an external load sensor (e.g., a generator, a stimulation pump, and/or the like).

Embodiments of the method 80 further include determining an advantageous gaseous fuel substitution rate in response to the engine load and speed (block 84). In embodiments, determining the advantageous gaseous fuel substitution rate may include referencing an advantageous fuel substitution rate map lookup table. For example, determining the advantageous gaseous fuel substitution rate may include referencing a lookup table that represents the advantageous gaseous substitution rate as a function of at least one of an engine load, an engine speed, an intake manifold temperature, and a methane number. In embodiments, the advantageous gaseous fuel substitution rate may be an optimal gaseous fuel substitution rate.

The method 80 may further include determining a minimum liquid fuel flow rate (block 86). Additionally, in embodiments, the method 80 includes determining an actual gaseous fuel substitution rate (block 88), an exhaust gas temperature (block 90), and an oxidation catalyst input temperature (block 92). The advantageous gaseous fuel substitution rate may be modified (block 94), for example, in response to the minimum liquid fuel flow rate, engine protection parameters, oxidation catalyst protection parameters, and/or the like. Additionally, as shown in FIG. 2, embodiments of the method 80 include determining an error term in response to the modified advantageous gaseous fuel substitution rate and the actual gaseous fuel substitution rate (block 96). The error term may be used to adjust or control a gaseous fuel control valve to modify the rate of gaseous fuel flow through the gaseous control valve (block 98).

While embodiments of the present invention are described with specificity, the description itself is not intended to limit the scope of this patent. Thus, the inventors have contemplated that the claimed invention might also be embodied in other ways, to include different steps or features, or combinations of steps or features similar to the ones described in this document, in conjunction with other technologies.

The following is claimed:

1. A method for dynamic adjustment of operation of a dual fuel internal combustion engine, the method comprising:
   determining, using a control module, at least one operating parameter of the engine, wherein the at least one operating parameter of the engine comprises an engine load;
   determining an advantageous gaseous fuel substitution rate in response to the engine load and an engine speed;
   determining an actual gaseous fuel substitution rate;
   determining an error term in response to the advantageous gaseous fuel substitution rate and the actual gaseous fuel substitution rate; and
   adjusting, in response to the error term, a ratio of gaseous fuel to liquid fuel consumed by the engine by adjusting a gas control valve.

2. The method of claim 1, further comprising modifying the advantageous gaseous fuel substitution rate in response to at least one of a minimum liquid fuel flow rate, an engine protection parameter, and an oxidation catalyst protection parameter.

3. The method of claim 1, wherein determining the engine load comprises:
   sensing one or more operational parameters of the engine, the one or more operational parameters comprising at least one of an engine speed, an intake manifold boost pressure, an intake manifold temperature, a compressor exit temperature, an indicated mean effective pressure (IMEP), a turbine inlet temperature, a turbine exit temperature, and an injection timing; and
   calculating the engine load in response to the sensed one or more operational parameters.

4. The method of claim 1, wherein determining the engine load comprises receiving an engine load signal from an external load sensor, wherein the external load sensor corresponds to at least one of a generator and a stimulation pump.

5. The method of claim 4, wherein the stimulation pump is a hydraulic fracturing pump.

6. The method of claim 1, wherein the advantageous gaseous fuel substitution rate is an optimal gaseous fuel substitution rate.

7. The method of claim 1, wherein determining the advantageous gaseous fuel substitution rate comprises referencing a lookup table, and wherein the lookup table represents the advantageous gaseous substitution rate as a function of at least one of engine load, engine speed, intake manifold temperature, and methane number.

8. A method comprising:
   determining an engine load;
   determining an advantageous gaseous fuel substitution rate in response to the engine load and an engine speed;
   determining a minimum liquid fuel flow rate;
   determining an actual gaseous fuel substitution rate in response to the engine load and the minimum liquid fuel flow rate;
   determining an exhaust gas temperature;
   determining an oxidation catalyst input temperature;
   modifying the advantageous gaseous fuel substitution rate in response to the minimum liquid fuel flow rate, the exhaust gas temperature, and the oxidation catalyst input temperature;
   determining an error term in response to the modified advantageous gaseous fuel substitution rate and the actual gaseous fuel substitution rate; and
   adjusting a gas control valve in response to the error term.

9. The method of claim 8, wherein determining the engine load comprises receiving an engine load signal from an external load sensor, wherein the external load sensor corresponds to at least one of a generator and a stimulation pump.

10. The method of claim 9, wherein the stimulation pump is a hydraulic fracturing pump.

11. The method of claim 8, wherein the advantageous gaseous fuel substitution rate is an optimal gaseous fuel substitution rate.

12. The method of claim 8, wherein determining the advantageous gaseous fuel substitution rate comprises referencing a lookup table, and wherein the lookup table represents the advantageous gaseous substitution rate as a function of at least one of engine load, engine speed, intake manifold temperature, and methane number.

13. A system for dynamic adjustment of operation of a dual fuel internal combustion engine, the system comprising:
   a gas control valve configured to control a flow of gaseous fuel; and
   a control module connected to the gas control valve and configured to provide control signals to the gas control valve, the control module comprising a processor configured to execute machine-readable instructions that, when executed, cause the processor to provide a plurality of modules, the plurality of modules comprising:
   an engine load module configured to determine an engine load associated with the engine;
   an optimal gaseous fuel substitution rate module configured to receive the determined engine load from the engine load module and determine an advantageous gaseous fuel substitution rate in response to the engine load;
   an actual gaseous fuel substitution rate module configured to (1) receive the determined engine load from the engine load module, (2) receive a diesel fuel rate; and (3) determine an actual gaseous fuel substitution rate in response to the engine load and diesel fuel rate;
   an input summing module configured to determine a gaseous fuel substitution rate reference in response to the determined advantageous gaseous fuel substitution rate and one or more operational parameters of the engine; and
   a gas substitution determination module configured to provide a position control signal, in response to the gaseous fuel substitution rate reference, to the gas control valve.

14. The system of claim 13, wherein the engine load module is configured to receive signals from at least one of an engine bus and an external load sensor, wherein the external load sensor is associated with at least one of a generator and a stimulation pump.

15. The system of claim 13, wherein the optimal gaseous fuel substitution rate module is configured to determine the advantageous gaseous fuel substitution rate in response to at least one of the engine load, an engine speed, an intake manifold temperature, and a methane number.

16. The system of claim 13, wherein the advantageous gaseous fuel substitution rate is an optimal gaseous fuel substitution rate.

17. The system of claim 13, further comprising an exhaust gas temperature module, the exhaust gas temperature module comprising an exhaust gas temperature shutdown process configured to shut down the engine in the event of an over-temperature condition of exhaust gas.

18. The system of claim 13, further comprising an oxidation catalyst protection module configured to:
   monitor one or more temperature parameters, the one or more temperature parameters comprising at least one of an absolute temperature of an oxidation catalyst and a rate of temperature increase of the oxidation catalyst; and
   provide a signal to the input summing module to reduce the rate of gaseous fuel substitution if at least one of the one or more temperature parameters exceeds a predetermined condition.

19. The system of claim 13, wherein the gas substitution determination module is further configured to:
   receive the reference optimal gaseous fuel substitution rate from the input summing module;
   receive the actual gaseous fuel substitution rate from the actual gaseous fuel substitution rate module;
   determine an error term by subtracting the actual gaseous fuel substitution rate from the advantageous gaseous fuel substitution rate;
   multiply the error term by a proportional term, an integral term, and a derivative term (PID); and
   scale the result of the multiplication in response to a configuration of the gas control valve.

* * * * *